June 25, 1935.  P. BEGHETTI  2,005,928

COOKING KETTLE DEVICE

Filed July 3, 1933

INVENTOR.
Peter Beghetti
BY Miller Boyken+Bried
ATTORNEYS.

Patented June 25, 1935

2,005,928

UNITED STATES PATENT OFFICE 2,005,928

COOKING KETTLE DEVICE

Peter Beghetti, San Francisco, Calif.

Application July 3, 1933, Serial No. 678,911

3 Claims. (Cl. 53—1)

This invention relates to the cooking of rice, spaghetti, mush, and similar pasty materials which have a tendency to stick to the bottom of the kettle while cooking, and the object of the invention is to provide means for inserting into any ordinary kettle to overcome the objection above noted. Also such means which will fit any size kettle, also which is simple and cheap. Other advantages of the invention will appear in the following description and accompanying drawing.

In the drawing Fig. 1 is a plan view of several concentric rings and perforated center plate assembled in form within a kettle.

Figure 1:
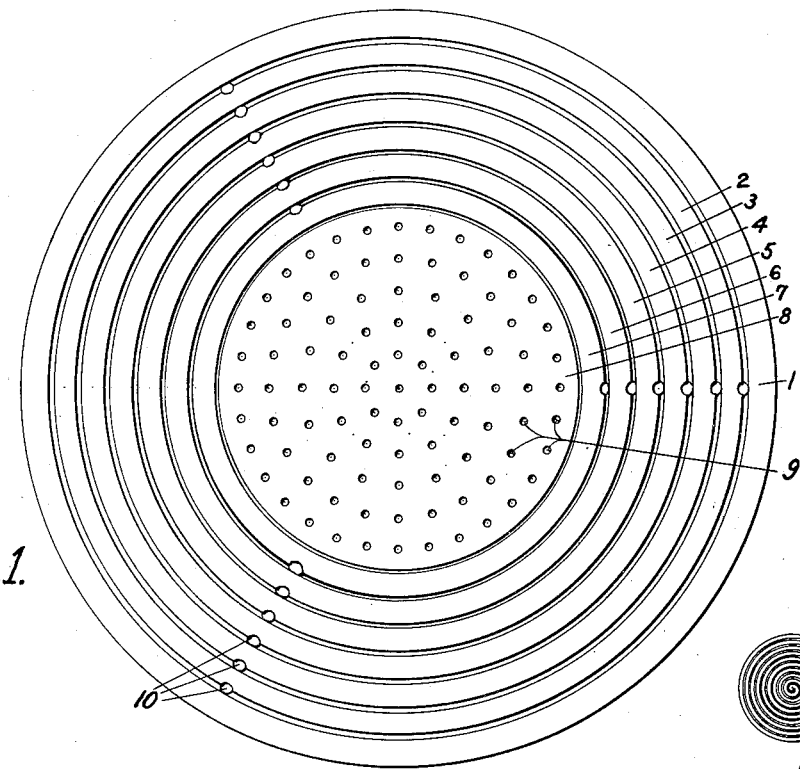

Briefly described, the invention comprises placing several concentric rings of large diameter wire within the kettle, and a perforated upwardly arched plate within the central ring. In the drawing the kettle is designated 1, the wire rings 2, 3, 4, 5, 6, 7, and the arched plate 8, the plate being perforated as at 9 with holes smaller than the material to be cooked in the kettle, and the rings spaced a slight distance apart preferably as by means of small ears 10 struck up from the metal. The spaces between the rings should preferably be of a size to prevent the food material from going in, yet permit free circulation of water.

For large kettles more rings should be used so as to cover the bottom, and for smaller kettles two or three rings may be omitted, while for very small kettles the arched plate or perforated false bottom 8 will of itself give good results.

Figure 3:
Fig. 3 shows a modification of the invention.
Figure 2:
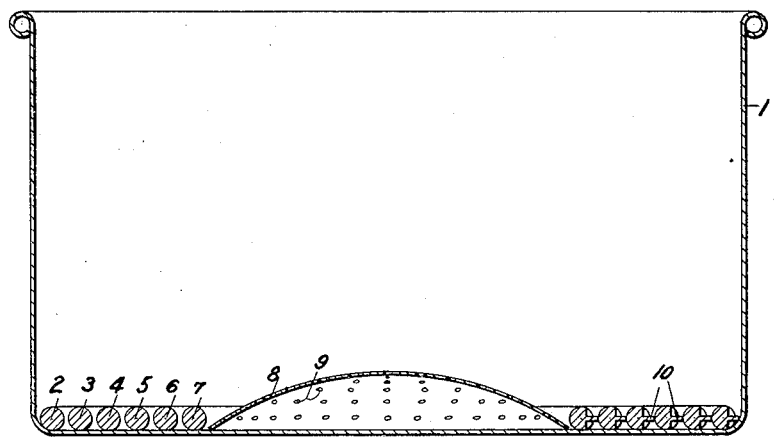
Fig. 2 is a vertical section of a cooking kettle with the devices of Fig. 1 in position therein.

For kettles of one size and where adjustability of diameter is not important, I have found that a plain spiral of heavy wire as shown in Fig. 3 will contribute most of the advantages of the invention, but for best results the whole combination as shown in Fig. 2 is best.

The arrangement of Figs. 1 and 2 is thus adapted to any size kettle, and, when used in the manner shown, has been found to absolutely overcome objectionable sticking or burning on of the material being cooked with any reasonable degree of heat as long as there is any water at all in the pot, as the water works through from one ring to another and under the central arched plate, and is thrown outwardly into the mass in the form of steam with a thorough steaming action on the food and a constant tendency to keep the mass free and loose. In fact, the apparatus will cook pasty materials like spaghetti, noodles, etc., perfectly without any stirring at all, yet without sticking, if some water is present. It is also a great advantage in the cooking of beans, dried fruits, and other foods.

The heavy wire rings, preferably of about $\frac{3}{16}$ or $\frac{1}{4}$ inch in diameter, seem to function to distribute the heat and prevent local action, while always providing recesses below for the circulation of water.

Having thus described my invention, what I claim is:

1. A cooking kettle device comprising a central raised false bottom, and surrounding said false bottom a series of rings of large diameter round wire arranged to lie substantially flat against the inner bottom of the kettle, said rings arranged with a slight space between each of less width than the thickness of the wire.

2. A cooking kettle device comprising a central false perforated bottom and surrounding said false bottom, a series of rings of large diameter round wire arranged to lie substantially flat against the inner bottom of the kettle, and provided with ears between the rings slightly spacing the rings apart.

3. A cooking kettle device comprising a series of heavy rings of round wire arranged to fit one within the other and to lie substantially flat against the inner bottom of the kettle, said rings being loose and of diameters to preserve but a slight clearance between the rings when nested.

PETER BEGHETTI.